(12) United States Patent  (10) Patent No.: US 9,256,663 B2
Bhatia et al.  (45) Date of Patent: Feb. 9, 2016

(54) METHODS AND SYSTEMS FOR MONITORING AND ANALYZING SOCIAL MEDIA DATA

(71) Applicant: XEROX CORPORATION, Norwalk, CT (US)

(72) Inventors: Sumit Bhatia, Webster, NY (US); Jingxuan Li, Miami, FL (US); Wei Peng, Fremont, CA (US); Tong Sun, Penfield, NY (US)

(73) Assignee: XEROX CORPORATION, Norwalk, CT (US)

( * ) Notice: Subject to any disclaimer, the term of this patent is extended or adjusted under 35 U.S.C. 154(b) by 237 days.

(21) Appl. No.: 13/973,927

(22) Filed: Aug. 22, 2013

(65) Prior Publication Data

US 2015/0058344 A1  Feb. 26, 2015

(51) Int. Cl.
*G06F 17/30* (2006.01)
(52) U.S. Cl.
CPC ................. *G06F 17/30598* (2013.01)
(58) Field of Classification Search
USPC .................................................. 707/706, 737
See application file for complete search history.

(56) References Cited

U.S. PATENT DOCUMENTS

| | | | | |
|---|---|---|---|---|
| 2012/0124052 | A1* | 5/2012 | Furey | G06Q 10/00 707/740 |
| 2012/0259616 | A1* | 10/2012 | Peng | G06F 17/274 704/9 |
| 2013/0041921 | A1* | 2/2013 | Cooper | G06F 17/30672 707/780 |
| 2013/0073336 | A1* | 3/2013 | Heath | G06Q 30/02 705/7.29 |
| 2013/0103667 | A1* | 4/2013 | Minh | G06F 17/30864 707/709 |
| 2013/0191395 | A1* | 7/2013 | Dowlaty | G06Q 50/01 707/740 |
| 2015/0012331 | A1* | 1/2015 | Carter | G06Q 30/0201 705/7.29 |
| 2015/0150023 | A1* | 5/2015 | Johnson | G06F 9/52 718/107 |

OTHER PUBLICATIONS

Barnes, N.G., "Exploring the Link Between Customer Care and Brand Reputation in the Age of Social Media," Society for New Communication Research, 2008, pp. 1-8.
Dereszynski, E. et al., "Probabilistic Models for Anomaly Detection in Remote Sensor Data Streams," UAI, 2007, pp. 75-82.
Kanhabua, N. et al., "Identifying Relevant Temporal Expressions for Real-World Events," Proceedings of the SIGIR 2012 Workshop on Time-aware information Access, Portland, Oregon, 2012, pp. 1-4.
Kietzmann, J. H. et al., "Social media? Get serious! Understanding the functional building blocks of social media", Business Horizons, 2011, vol. 54, pp. 241-251.
Mangold, W.G. et al., "Social media: The new hybrid element of the promotion mix", Business Horizons, 2009, vol. 52, pp. 357-365.

(Continued)

*Primary Examiner* — Kim Nguyen
(74) *Attorney, Agent, or Firm* — MH2 Technology Law Group LLP (57) ABSTRACT

A system and method for analyzing social media data by obtaining social media data from a social media platform, where the social media data includes documents from multiple users of the social media platform; classifying the documents using a sentiment classifier; tokenizing the documents into terms; associating a sentiment with each term; detecting a first event based on a number of occurrences of a first term in the documents; and providing information associated with the event to a user, where the information includes the first term and a sentiment associated with the first term.

14 Claims, 5 Drawing Sheets

(56) References Cited

OTHER PUBLICATIONS

Wagner, M. M. et al., "The Emerging Science of Very Early Detection of Disease Outbreaks", J. Public Health Management Practice, 2001, vol. 7, No. 6, pp. 51-59.

Croarkin, C. et al., NIST/SEMATECH c-Handbook of Statistical Methods, Engineering Statistics Handbook. The Institute, 2001, available at http://www.iti.nist.gov/div898/handbook/, accessed Aug. 22, 2013.

Cunningham, H., "Gate, a General Architecture for Text Engineering," Computers and the Humanities, 2002, vol. 36, pp. 223-254.

* cited by examiner

METHODS AND SYSTEMS FOR MONITORING AND ANALYZING SOCIAL MEDIA DATA

TECHNICAL FIELD

The present disclosure relates generally to methods, systems, and computer-readable media for a monitoring and analyzing social media data.

BACKGROUND

Social media platforms are valuable sources of information on public expressions and opinions. For example, social media platform users often post opinions or comments related to particularly good or particularly bad experiences with a good or service they have used. Such information would be beneficial to the providers of the goods and/or services, and can allow the providers to receive real-time feedback from their customers.

The large volume of data produced by social media platforms can offer the providers of goods and/or services the overall opinions of their customers, but it is virtually impossible to manually monitor and analyze such large amounts of data.

Therefore, there is a need for methods and systems for monitoring and analyzing social media data.

SUMMARY

The present disclosure relates generally to methods, systems, and computer readable media for providing these and other improvements to monitoring and analyzing social media data.

In some embodiments, a computing device can analyze social media data by obtaining social media data from a social media platform, where the social media data includes documents from multiple users of the social media platform; classifying the documents using a sentiment classifier; tokenizing the documents into terms; associating a sentiment with each term; detecting a first event based on a number of occurrences of a first term in the documents; and providing information associated with the event to a user, where the information includes the first term and a sentiment associated with the first term.

In further embodiments, the computing device can calculate a term frequency-inverse document frequency ("TFIDF") metric for the first term, where the information associated with the event further includes the TFIDF metric. For example, the TFIDF metric can be a time normalized TFIDF metric.

In some embodiments the time normalized TFIDF metric can be calculated using a formula that factors in decay over time. In further embodiments, the decay can be calculated using the formula that factors in a timestamp associated with each document.

In additional embodiments, the social media data can be obtained in one or more of a batch format and a streaming format. Further, in certain implementations, the first event can be detected based on the sentiment associated with the first term, and, in other embodiments, the first event can only be detected when the first term is associated with a negative sentiment. In other embodiments, the information is only provided to the user when the first term is associated with a negative sentiment.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

The following detailed description refers to the accompanying drawings. Wherever possible, the same reference numbers are used in the drawings and the following description refers to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

Figure 1:
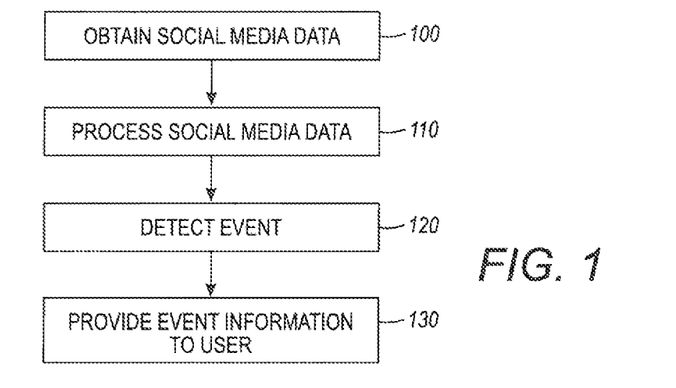
FIG. 1 is a flow diagramming illustrating an exemplary method of monitoring and analyzing social media data, consistent with certain disclosed embodiments.

FIG. 1 is a flow diagramming illustrating an exemplary method of monitoring and analyzing social media data, consistent with certain disclosed embodiments. The process can begin in 100 when a computing device receives social media data from at least one social media platform. In embodiments, the social media data can be textual data produced by users of the at least one social media platform. In some embodiments, the social media data can include textual data from multiple social media platforms. For example, the textual data can include, but is not limited to, user-generated blog posts, product reviews, public messages, shared information, etc. As used herein, a "document" refers to a subset of the textual data that is generated by a single user via a single social media platform (e.g. a user-generated blog post, a user generated public message, etc.).

In some embodiments, the social media data can include timestamps pertaining to when the textual data was added to the social media platform. For example the textual data can be public messages shared by users of a particular social media platform, and the social media data can include the textual data and a timestamp based on when each document was shared by the user.

Additionally or alternatively, the social media data can include user information pertaining to the user that was the source of each document. For example, the user information can be the user name of a user that posted textual data, the address of the user that shared textual data, etc.

In additional embodiments, the computing device can either receive social media data related to a particular inquiry (e.g. a company name, a brand name, etc.) or can extract from the social media a set of textual data pertaining to the particular inquiry. For example, the computing device can access, utilize, and/or request data from a web crawler that crawls publicly available documents made on social media platforms. The web crawler can regularly crawl social media platform websites and gather data relevant to a particular inquiry. In some embodiments, the crawler can crawl social media platform websites for posts containing specified keywords, or variations thereof. For example, the computing device can request data from a web crawler related to a particular company name or brand name, and the web crawler can crawl social media platform websites, detect documents that contain the keywords, or variations thereof, and return the documents to the computing device.

As an additional example, the computing device can receive social media data from a source related to the particular company or brand name. Examples include receiving social media data from a webpage associated with the company or brand name, public messages tagged as associated with the company or brand name, etc.

In 110, the computing device can process the social media data. In embodiments, the computing device can perform linguistic processing of the social media data. For example, parts of speech can be identified and tagged using natural language processing software, such as the General Architecture for Text Engineering ("GATE") software.

Additionally, the computing device can perform sentiment analysis of the social media data. In embodiments, the computing device can use machine learning based sentiment classifiers known in the art to classify each document in the social media data. For example, the computing device can classify a first document as positive based on a determination that the document likely conveys a positive sentiment (e.g. happy, satisfied, etc.), and the computing device can classify a second document as negative based on a determination that the document likely conveys a negative sentiment (e.g. angry, sad, etc.).

The processed social media data, along with any identifications, tags, or sentiment classifications can then be stored. For example, such data can be stored in a local database. Additional processing and/or analysis steps that can be performed are described in detail below.

In 120, the computing device can detect events in the processed social media data. In embodiments, detected events can include anomalous or new occurrences of terms in the processed social media data. As used herein, a term can refer to a subset of a document, such as a noun phrase, and can be one or more words in length. For example, if a new noun phrase begins appearing in social media data related to a particular brand name, the computing device can detect a new event. As an additional example, if a noun phrase begins appearing with an unusually high frequency in social media data related to the particular brand name, compared to previous social media data related to the same brand name, the computing device can detect an anomalous event.

In some embodiments, new event detection and anomalous event detection can be based on threshold levels of occurrences within a given time frame. For example, the computing device can process social media data related to a particular brand name posted during one month. Using the timestamps included with the social media data, the computing device can determine, for example, the average number of occurrences per day of a noun phrase in the textual data (e.g. 100 occurrences). Based on the average number of occurrences, the computing device can set a threshold level for an anomalous event (e.g. 200 occurrences). If, on a particular day, the number of occurrences of the noun phrase is greater than the threshold level, then an anomalous event can be detected. In embodiments, the threshold level for an anomalous event can additionally or alternatively be set by a user.

As an additional example, an anomalous event can be detected using a statistical test to detect outliers (i.e. anomalous events) in a univariate data set (i.e. a term's frequency). For example, an anomalous event can be detected using the Grubbs' test to determine an "outlier" time period where a term's frequency (e.g. the use of a particular noun phrase) is statistically higher than its historical average. Such an "outlier" time period can be detected as an anomalous event.

As a further example, a threshold level for a new event can be previously determined or can be set by the computing device (e.g. five occurrences per day, thirty occurrence per week, etc.). If, during a particular time frame, the number of occurrences of a noun phrase is greater than the threshold level for new events, then a new event can be detected. Accordingly, unimportant events (e.g. spelling mistakes) or events that occur infrequently may not be detected as new events.

It should be noted that for the purpose of detecting events, it is often the case that the sentiment of the social media data can be helpful in determining the importance of an event or even if an event should be detected. For example, from a customer support perspective, documents that conveys a negative sentiment (e.g. angry, sad, etc.) are likely more important. Accordingly, a user that represents a particular company may desire event threshold levels to be adjusted such that documents with a negative sentiment are more likely to trigger a new or anomalous event. For example, the computing device can set the threshold level for documents with a negative sentiment to be lower than the threshold level for documents with a neutral and/or positive sentiment. In further embodiments, only documents with a negative sentiment may trigger a new or anomalous event.

It should be further noted that certain social media platforms may have a large user base and may provide a large volume of social media data. Accordingly, in some embodiments, a large number of events may be detected from the social media data. However, not all events may be equally important to a given user. Accordingly, in further embodiments, a metric to measure the relative importance of an event can be utilized.

For example, the relative importance of an event can be measured using the formula:

$$\text{TFIDF}(\text{term},\text{document},\text{Documents}) = \Sigma_{document \in Documents} \text{tf}(\text{term},\text{document}) \times \text{idf}(\text{term}, \text{Documents})$$

where tf denotes term frequency and idf indicates inverse document frequency. Additionally, TFIDF can refer to a term frequency-inverse document frequency metric. This formula can measure the relative importance of a term ("term") in a document ("document") in terms of its frequency in every document ("Documents") of a given set. Accordingly, all the social media data related to a particular inquiry (e.g. a company name or brand name) can be every document ("Documents"). Therefore, the above formula can be used to measure the relative importance of a term in a document in relation to the term's frequency in the social media data.

Additionally, in some embodiments, a user may be primarily concerned with recent and/or current issues. Accordingly, the time of occurrence of a term can also be an important measure of its importance. Accordingly, if each document is associated with a timestamp, a time normalized version of the above formula can be used, such as:

$$TFIDF(\text{term, document, Documents}) =$$

$$\sum_{doc \in Docs} (tf(\text{term, document}) \times \text{decay}) \times idf(\text{term, Documents}) =$$

$$\sum_{doc \in Docs} (tf(\text{term, doccument}) \times e^{-(currentTime - documentTime)}) \times$$

$$idf(\text{term, Documents})$$

where the decay function assigns a higher weight to more recent documents, and documentTime represents a timestamp associated with a document.

Accordingly, a TFIDF score can be calculated for the term associated with each detected event and/or, in some embodiments, an event detection can be contingent on a threshold TFIDF score for the term.

In 130, the computing device can provide event information pertaining to the detected event to the user. For example, the computing device can output information, such as the term associated with the event, the number of occurrences of the term, the textual data associated with the term, timestamps associated with the term, the TFIDF score for the term, the time frame for the event, user information associated with the textual data, etc., to a web service front-end that can be accessed by the user.

In some embodiments, the computing device can store each detected event and the event information to a database, and can provide event information to the user based on a request by the user. For example, the user can request all events during a particular time frame, all events associated with textual data with a negative sentiment, etc. The computing device can then provide event information for each event that meets the given criteria.

While the steps depicted in FIG. 1 have been described as performed in a particular order, the order described is merely exemplary, and various different sequences of steps can be performed, consistent with certain disclosed embodiments. Additional variations of steps can be utilized, consistent with certain disclosed embodiments. Further, the steps described are not intended to be exhaustive or absolute, and various steps can be inserted or removed.

Figure 2:
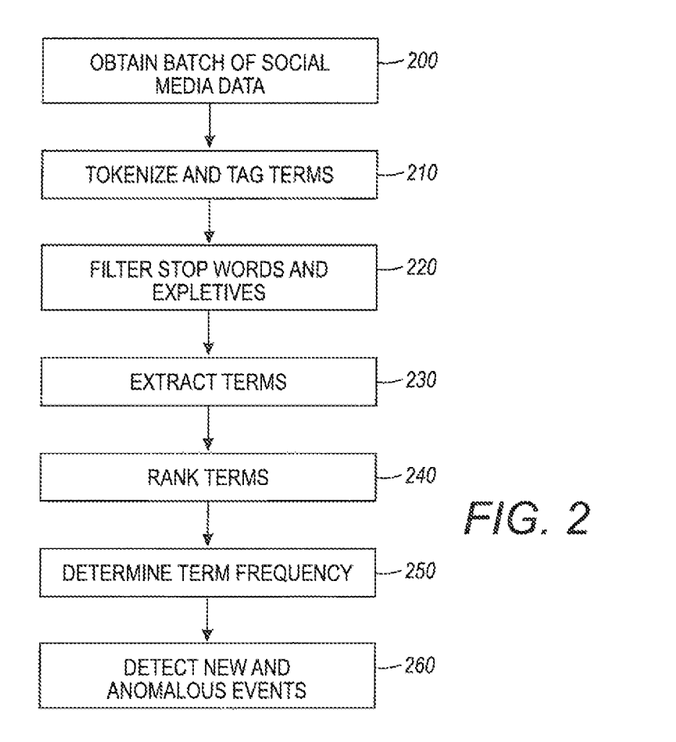
FIG. 2 is a flow diagramming illustrating an exemplary method of monitoring and analyzing social media data received in a batch format, consistent with certain disclosed embodiments.

FIG. 2 is a flow diagramming illustrating an exemplary method of monitoring and analyzing social media data received in a batch format, consistent with certain disclosed embodiments. The process can begin in 200 when a computing device receives a batch of social media data from at least one social media platform. In embodiments, the social media data can be textual data produced by users of the at least one social media platform. For example, the textual data can include, but is not limited to, user-generated blog posts, product reviews, public messages, shared information, etc.

In some embodiments, the social media data can include timestamps pertaining to when the textual data was added to the social media platform. Additionally or alternatively, the social media data can include user information pertaining to the user that was the source of each document in the social media data.

In embodiments, the computing device can receive social media data related to a particular inquiry (e.g. a company name, a brand name, etc.), can extract from the social media data a set of textual data pertaining to the particular inquiry, and/or can utilize a web crawler to obtain the social media data.

In 210, the computing device can begin processing the social media data by tokenizing and tagging sentence fragments from the social media data. For example, the computing device can perform linguistic processing of the social media data and tokenize the social media data into terms. Additionally, parts of speech can be identified and the terms can be tagged using natural language processing software, such as the GATE software.

In some embodiments, the computing device can perform sentiment analysis of the social media data. For example, the computing device can use machine learning based sentiment classifiers known in the art and associate a sentiment with each document and/or each term.

The processed social media data, along with any identifications, tags, and/or sentiment classifications can then be stored. For example, such data can be stored in a local database.

In 220, the computing device can filter out stop words and/or expletives. For example, the computing device can filter out words such as "the," "is," "at," "which," "on," offensive words, and/or other words that may not contribute to the meaning of a term or document.

In 230, the computing device can extract terms pertaining to a particular part of speech. For example, the computing device can extract terms pertaining to nouns or noun phrases, which, in embodiments, may be particularly relevant in identifying an entity that could be interested in the contents of the social media data (e.g. a company name or a brand name).

In 240, the computing device can calculate a TFIDF score for each extracted term and rank each term based on the score. For example, the computing device can score and rank each noun and/or noun phrases based a time normalized TFIDF score.

In 250, the computing device can determine a number of occurrences for each term for various time frames. In some embodiments, the computing device can additionally or alternatively determine a number of occurrences associated with a particular sentiment for each term for various time frames. For example, a number of occurrences in a given day of a particular term that is associated with a negative sentiment can be determined.

In 260, the computing device can detect new and anomalous events based on the number of occurrences of the term determined in 250. For example, an anomalous event can be detected using the Grubbs' test and/or based on thresholds set using the same batch of social media data or a previous batch of social media data. Additionally, in some embodiments, the TFIDF score can also be utilized when detecting an event and/or the TFIDF score can be associated with the detected event.

While the steps depicted in FIG. 2 have been described as performed in a particular order, the order described is merely exemplary, and various different sequences of steps can be performed, consistent with certain disclosed embodiments. Additional variations of steps can be utilized, consistent with certain disclosed embodiments. Further, one or more of the steps depicted in FIG. 2 can be combined with steps depicted in other disclosed embodiments, such as the embodiments described in FIG. 1 and/or FIG. 3. The steps described are not intended to be exhaustive or absolute, and various steps can be inserted or removed.

Figure 3:
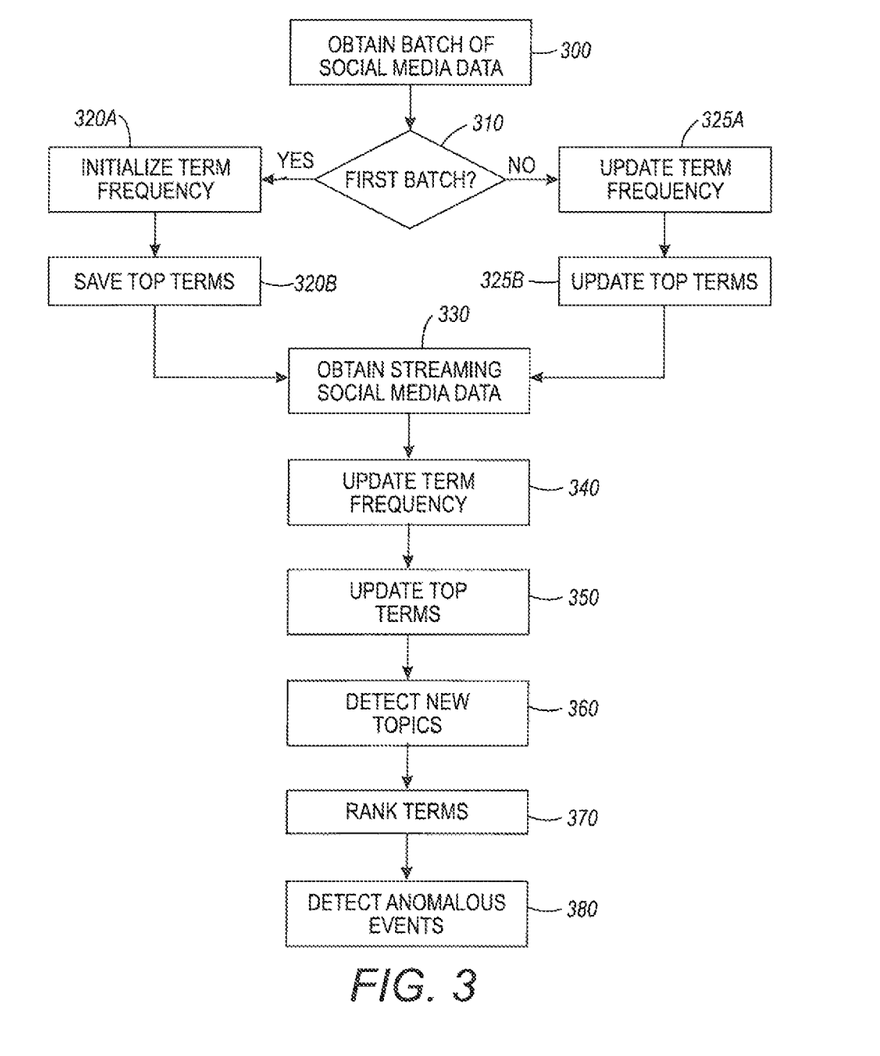
FIG. 3 is a flow diagramming illustrating an exemplary method of monitoring and analyzing social media data received in a streaming format, consistent with certain disclosed embodiments.

FIG. 3 is a flow diagramming illustrating an exemplary method of monitoring and analyzing social media data received in a streaming format, consistent with certain disclosed embodiments. The process can begin in 300 when a computing device receives a batch of social media data from at least one social media platform. In embodiments, the social media data can be textual data produced by users of the at least one social media platform. For example, the textual data can include, but is not limited to, user-generated blog posts, product reviews, public messages, shared information, etc.

In some embodiments, the social media data can include timestamps pertaining to when the textual data was added to the social media platform. Additionally or alternatively, the social media data can include user information pertaining to the user that was the source of each document in the social media data.

In additional embodiments, the computing device can receive social media data related to a particular inquiry (e.g. a company name, a brand name, etc.), can extract from the social media data a set of textual data pertaining to the particular inquiry, and/or can utilize a web crawler to obtain the social media data.

If, in 310, the batch of social media data is the first batch received related to the particular inquiry, the computing device can, in 320A, begin processing the social media data by tokenizing and tagging terms from the social media data. Additionally, parts of speech can be identified and the terms can be tagged using natural language processing software, and stop words and/or expletives can be filtered out. The terms can then be ranked based on number of occurrences and/or parts of speech. For example, nouns and noun phrases can be ranked based on number of occurrences.

In some embodiments, in 320B, the computing device can save the terms with the most occurrences. For example, the computing device can save the top 3000 nouns and noun phrases.

If, in 310, the batch of social media data is not the first batch received related to the particular inquiry, the computing device can, in 325A, begin processing the social media data by tokenizing and tagging terms from the social media data. Additionally, parts of speech can be identified and the terms can be tagged using natural language processing software, and stop words and/or expletives can be filtered out. Previous rankings of terms can then be updated based on this subsequent batch of social media data.

In some embodiments, in 325B, the computing device can update the terms with the most occurrences. For example, the computing device can update the top 3000 nouns and noun phrases if new nouns and/or noun phrases occur in the sequent batch with enough occurrences.

In 330, the computing device can receive streaming social media data. In some embodiments, the computing device can receive the streaming social media data related to the particular inquiry over a predetermined time period. For example, the computing device can receive social media data in real time from a social networking platform for an hour.

In 340, the computing device can process the social media data received over the predetermined time period by tokenizing and tagging terms from the social media data. Additionally, parts of speech can be identified and the terms can be tagged using natural language processing software, and stop words and/or expletives can be filtered out. Previous rankings of terms can then be updated based on the social media data received over the predetermined time period.

In some embodiments, 350, the computing device can update the terms with the most occurrences. For example, the computing device can update the top 3000 nouns and noun phrases if new nouns and/or noun phrases occur in the social media data received with enough occurrences.

In 360, the computing device can detect new events from the social media data received over the predetermined time period. For example, a new event can be detected based on a predetermined threshold.

In 370, the computing device can rank the terms from the social media data received over the predetermined time period using, for example, the TFIDF score from the term and/or the number of occurrences of the term compared to the first and/or subsequent batches of data received in 300.

In some embodiments, in 380, the computing device can detect anomalous events from the ranked terms. For example, the computing device may only detect anomalous events based on the top ranked terms (e.g. the top 50 ranked terms) using the Grubbs' test.

The computing device can then store the number of occurrences and TFIDF scores of top ranked terms, sentiment scores associated with top ranked terms, new events, anomalous events, user information associated with the social media data, etc. For example, such information can be stored in a local database.

The computing device can then receive a subsequent set of streaming social media data. For example, the computing device can receive social media data in real time from a social networking platform for the next hour. Additionally, in some embodiments, the computing device may receive another batch of social media data (300). For example, if the computing device does not receive any social media data over a period of time, the computing device may receive a batch of social media data the next time social media data is received.

While the steps depicted in FIG. 3 have been described as performed in a particular order, the order described is merely exemplary, and various different sequences of steps can be performed, consistent with certain disclosed embodiments. Additional variations of steps can be utilized, consistent with certain disclosed embodiments. Further, one or more of the steps depicted in FIG. 3 can be combined with steps depicted in other disclosed embodiments, such as the embodiments described in FIG. 1 and/or FIG. 2. The steps described are not intended to be exhaustive or absolute, and various steps can be inserted or removed.

Figure 4:
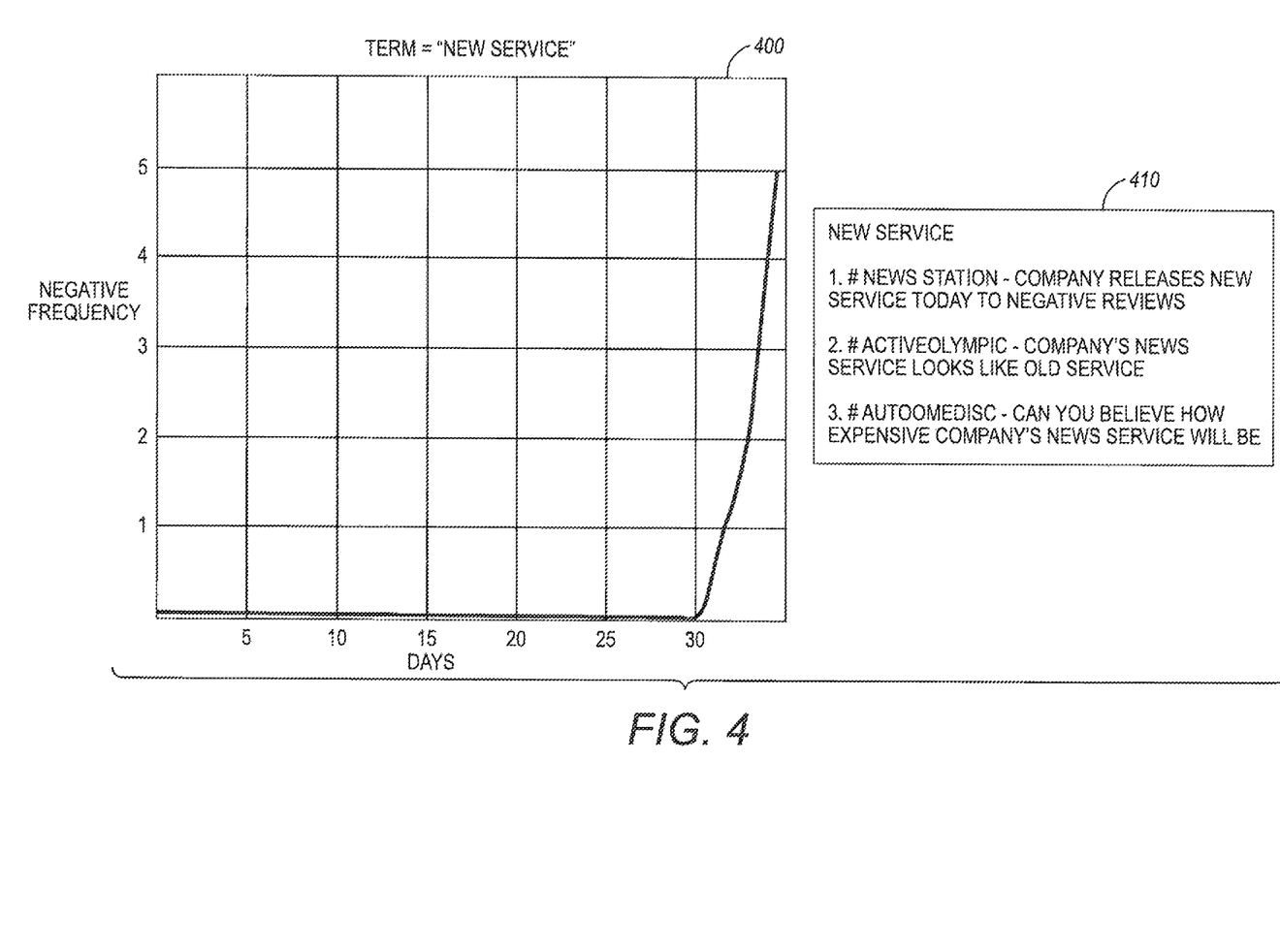
FIG. 4 is a diagram of an exemplary chart depicting a new event and a diagram depicting exemplary social media data, consistent with certain disclosed embodiments.

FIG. 4 is a diagram of an exemplary chart depicting a new event and a diagram depicting exemplary social media data, consistent with certain disclosed embodiments. As depicted in FIG. 4, graph 400 shows a graph of the frequency of a term over a period of time. The x-axis of graph 400 indicates days and the y-axis of graph 400 indicates the frequency of the term used with textual data that is associated with a negative sentiment.

For the purposes of this example, it can be assumed that a company named "Company" debuted a new service ("New Service") on or around day 30. Accordingly, no textual data from previous batches or streamed social media data from before day thirty includes the words "New Service" and/or no textual data with negative sentiment from previous batches or streamed social media data included the words "New Service." The previous batches or streamed social media data may be social media data that is associated with or contains the textual data "Company." Accordingly, when, after day 30, a computing device detects that at least five occurrences of a new batch of social media data or newly streamed social media data associated with "Company" includes the term "New Service," the computing device can detect a new event. Box 410 includes various examples of messages that could be received after day 30.

FIG. 4 merely depicts a simplified example of a situation where a new event can be detected and is only for the purpose of illustration. The data depicted in FIG. 4 is not intended to depict a real world example, and, accordingly, the data depicted is not intended to be limiting.

Figure 5:
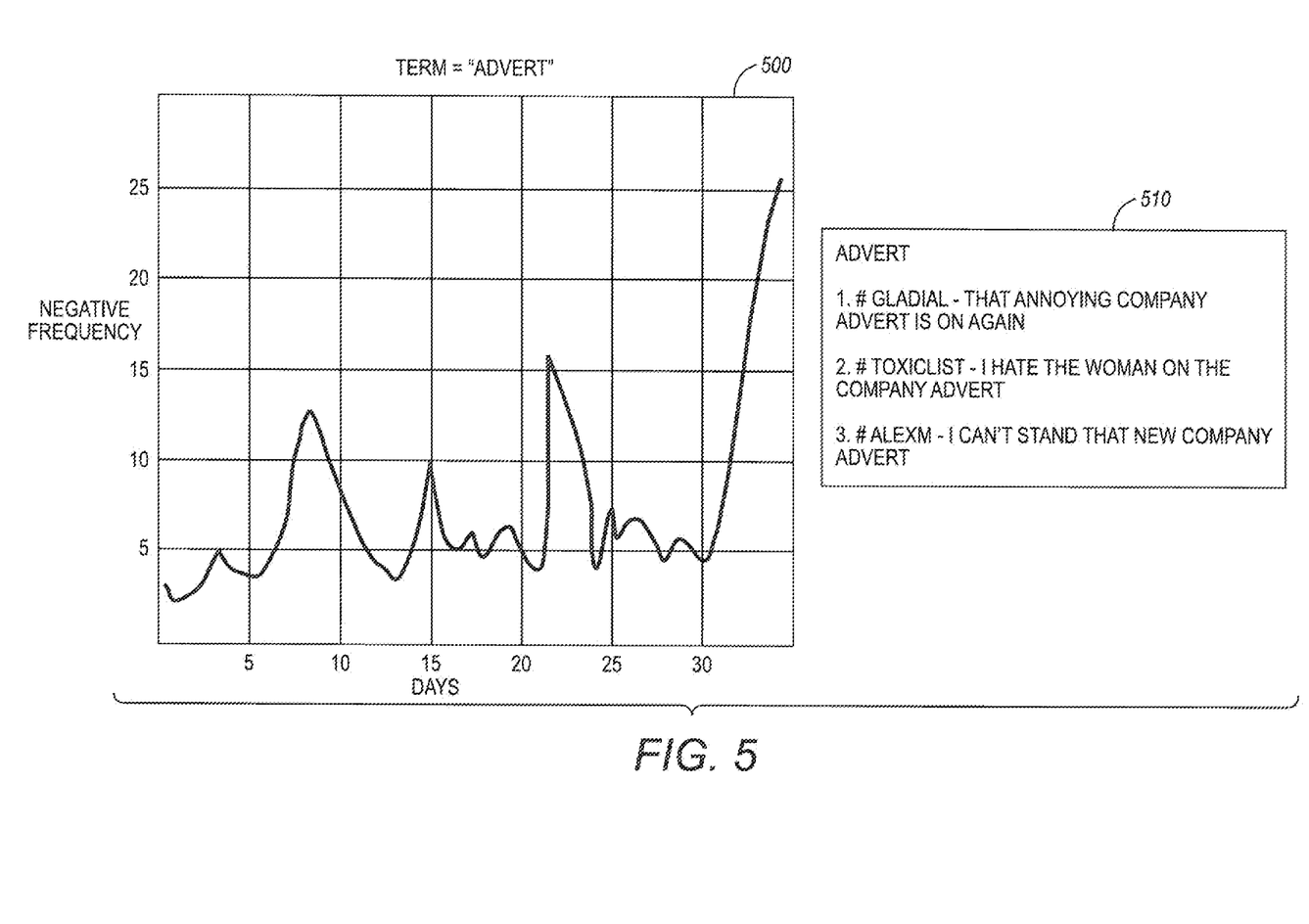
FIG. 5 is a diagram of an exemplary chart depicting an anomalous event and a diagram depicting exemplary social media data, consistent with certain disclosed embodiments.

FIG. 5 is a diagram of an exemplary chart depicting an anomalous event and a diagram depicting exemplary social media data, consistent with certain disclosed embodiments. As depicted in FIG. 5, graph 500 shows a graph of the frequency of a term over a period of time. The x-axis of graph 500 indicates days and the y-axis of graph 500 indicates the frequency of the term used with textual data that is associated with a negative sentiment.

For the purposes of this example, it can be assumed that a company named "Company" debuted a new advert on or around day 30 that was not popular with consumers. Accordingly, a spike in negative comments about an "advert" occurred in social media data related to Company after day 30. The previous batches or streamed social media data related to Company before day 30 may have also included negative comments about previous adverts, but, in this example, not to the extent that occurred after day 30. Accordingly, when, after day 30, a computing device detects that an anomalous number of occurrences in a new batch of social media data or newly streamed social media data of documents associated with "Company" include the term "advert" (e.g. using the Grubbs' test), the computing device can detect an anomalous event. Box 510 includes various examples of messages that could be received after day 30.

FIG. 5 merely depicts a simplified example of a situation where an anomalous event can be detected and is only for the purpose of illustration. The data depicted in FIG. 5 is not intended to depict a real world example, and, accordingly, the data depicted is not intended to be limiting.

Figure 6:
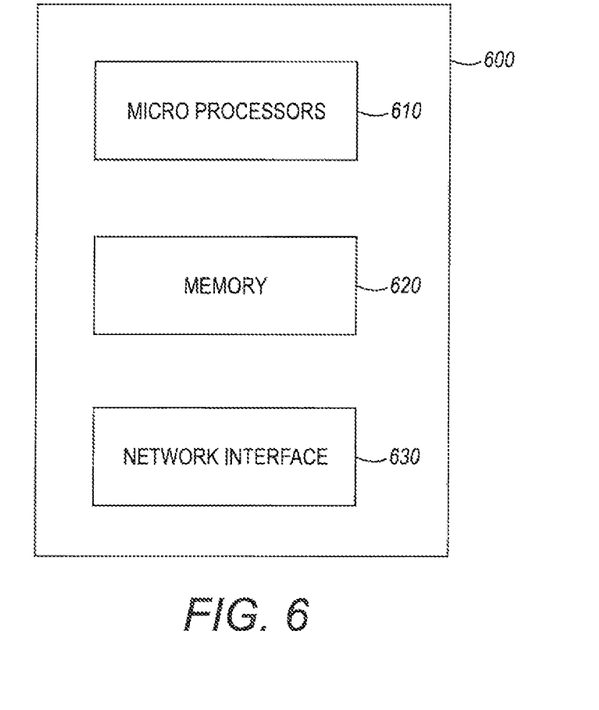
FIG. 6 is a diagram illustrating an exemplary hardware system for analyzing and monitoring social media data, consistent with certain disclosed embodiments.

FIG. 6 is a diagram illustrating an exemplary hardware system for analyzing and monitoring social media data, consistent with certain disclosed embodiments. Computing device 600 may represent any type of one or more computing devices. For example, computing device 600 can comprise a laptop, a desktop, a server, a smartphone, a tablet computer, etc.

Computing device 600 may include, for example, one or more microprocessors 610 of varying core configurations and clock frequencies; one or more memory devices or computer-readable media 620 of varying physical dimensions and storage capacities, such as flash drives, hard drives, random access memory, etc., for storing data, such as images, files, and program instructions for execution by one or more microprocessors 610; one or more transmitters for communicating over network protocols using network interface 630, such as Ethernet, code divisional multiple access (CDMA), time division multiple access (TDMA); etc. One or more microprocessors 610, one or more memory devices or computer-readable media 620, and network interface 630 may be part of a single device as disclosed in FIG. 6 or may be contained within multiple devices. Those skilled in the art will appreciate that the above-described componentry is exemplary only, as computing device 600 may comprise any type of hardware componentry, including any necessary accompanying firmware or software, for performing the disclosed embodiments.

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments. The steps described need not be performed in the same sequence discussed or with the same degree of separation. Likewise, various steps may be omitted, repeated, or combined, as necessary, to achieve the same or similar objectives or enhancements. Accordingly, the present disclosure is not limited to the above-described embodiments, but instead is defined by the appended claims in light of their full scope of equivalents.

What is claimed is:

1. A method for analyzing social media data, the method comprising:
    obtaining, using one or more processors, social media data from a social media platform, wherein the social media data comprises documents from a plurality of users of the social media platform;
    classifying the documents using a sentiment classifier;
    tokenizing the documents into terms;
    associating a sentiment classification with each term;
    detecting a first event based on a number of occurrences of a first term in the documents;
    providing information associated with the first event to a user, wherein the information comprises the first term and a sentiment classification associated with the first term; and
    calculating a term frequency-inverse document frequency ("TFIDF") metric for the first term, wherein:
        the information associated with the first event further comprises the TFIDF metric,
        the TFIDF metric is a time normalized TFIDF metric, and
        the TFIDF metric is calculated using the formula:

$$TFIDF(\text{first term, document, documents}) = \sum_{document \in documents} (tf(\text{term, document}) \times decay) \times idf(\text{term, documents})$$

wherein each "document" is a document that included the first term, "tf" is the term frequency, "idf" is the inverse document frequency, and decay is calculated using a timestamp associated with each document.

2. The method of claim 1, wherein "decay" is calculated using the formula:

$$decay = e^{-(current\ time - document\ time)}$$

wherein "document time" is determined based on the timestamp associated with each document.

3. The method of claim 1, wherein the social media data is obtained in batch format.

4. The method of claim 1, wherein the social media data is obtained in streaming format.

5. The method of claim 1, wherein detecting the first event is further based on the sentiment classification associated with the first term.

6. The method of claim 5, wherein the first event is only detected when the first term is associated with a negative sentiment classification.

7. The method of claim 1, wherein the information is only provided to the user when the first term is associated with a negative sentiment classification.

8. A system for analyzing social media data, the system comprising:
    a processing system comprising one or more processors; and
    a memory system comprising one or more computer-readable media, wherein the one or more computer-readable media contain instructions that, when executed by the processing system, cause the processing system to perform operations comprising:
        obtaining, using one or more processors, social media data from a social media platform, wherein the social media data comprises documents from a plurality of users of the social media platform;
        classifying the documents using a sentiment classifier;

tokenizing the documents into terms;
associating a sentiment classification with each term;
detecting a first event based on a number of occurrences of a first term in the documents; and
providing information associated with the first event to a user, wherein the information comprises the first term and a sentiment classification associated with the first term;
calculating a term frequency-inverse document frequency ("TFIDF") metric for the first term, wherein:
the information associated with the first event further comprises the TFIDF metric,
the TFIDF metric is a time normalized TFIDF metric and
the TFIDF metric is calculated using the formula:

$$TFIDF(\text{first term, document, documents}) = \sum_{document \in documents} (tf(\text{term, document}) \times decay) \times idf(\text{term, documents})$$

wherein each "document" is a document that included the first term "tf" is the term frequency, "idf" is the inverse document frequency, and decay is calculated using a timestamp associated with each document.

9. The system of claim 8, wherein "decay" is calculated using the formula:

$$decay = e^{-(current\ time - document\ time)}$$

wherein "document time" is determined based on the timestamp associated with each document.

10. The system of claim 8, wherein the social media data is obtained in batch format.

11. The system of claim 8, wherein the social media data is obtained in streaming format.

12. The system of claim 8, wherein detecting the first event is further based on the sentiment classification associated with the first term.

13. The system of claim 12, wherein the first event is only detected when the first term is associated with a negative sentiment classification.

14. The system of claim 8, wherein the information is only provided to the user when the first term is associated with a negative sentiment classification.

* * * * *